(12) United States Patent
Rao

(10) Patent No.: US 6,999,282 B2
(45) Date of Patent: Feb. 14, 2006

(54) SLIDER WITH CAVITY DAM ANGLED LEADING EDGE AND FURTHER DISPLACED RECESSED SURFACE POSITIONED OUTSIDE ANGLED RAILS

(75) Inventor: Ram Mahan Rao, Roseville, MN (US)

(73) Assignee: Seagate Technology LLC, Scotts Valley, CA (US)

( * ) Notice: Subject to any disclaimer, the term of this patent is extended or adjusted under 35 U.S.C. 154(b) by 16 days.

(21) Appl. No.: 10/113,997

(22) Filed: Apr. 1, 2002

(65) Prior Publication Data

US 2003/0039073 A1   Feb. 27, 2003

Related U.S. Application Data

(60) Provisional application No. 60/318,852, filed on Sep. 13, 2001, provisional application No. 60/314,522, filed on Aug. 22, 2001.

(51) Int. Cl.
- *G11B 5/60* (2006.01)
- *G11B 17/32* (2006.01)
- *G11B 21/21* (2006.01)

(52) U.S. Cl. ............... 360/236; 360/235.6; 360/235.7; 360/235.8; 360/236.3

(58) Field of Classification Search ...... 360/235.4–237
See application file for complete search history.

(56) References Cited

U.S. PATENT DOCUMENTS

| | | | |
|---|---|---|---|
| 4,212,044 A | 7/1980 | Plotto | 360/103 |
| 4,225,891 A | 9/1980 | Plotto | 360/103 |
| 4,486,798 A | 12/1984 | Feliss et al. | 360/103 |
| 4,510,541 A | 4/1985 | Sasamoto | 360/97 |
| 4,636,894 A | 1/1987 | Mo | 360/103 |
| 4,700,248 A | 10/1987 | Coughlin et al. | 360/103 |
| 5,210,666 A | 5/1993 | Chapin et al. | 360/103 |
| 5,317,465 A | 5/1994 | Chapin et al. | 360/103 |
| 5,406,432 A | 4/1995 | Murray | 360/103 |
| 5,467,238 A | 11/1995 | Lee et al. | 360/128 |

(Continued)

FOREIGN PATENT DOCUMENTS

JP          54-8514          1/1979

(Continued)

OTHER PUBLICATIONS

Design, Simulation, Fabrication and Measurement of a 25NM, 50% Slider By: S. Lu et al., 1995 IEEE Transaction on Magnetics, Nov. 1995, vol. 31, No. 6, pp. 2952-2954.

(Continued)

*Primary Examiner*—Craig A. Renner
(74) *Attorney, Agent, or Firm*—Westman, Champlin & Kelley, P.A.

(57) ABSTRACT

A disc head slider is provided and includes a slider body having a disc-facing surface which includes a bearing surface that is generally disposed within a bearing surface plane. An angled inside rail, an angled outside rail and a cavity dam are formed on the disc-facing surface. At least one of the angled inside rail, the angled outside rail and the cavity dam includes a surface portion that defines at least a portion of the bearing surface. A sub-ambient pressure cavity is formed between the angled inside and outside rails, and includes a cavity floor that is displaced from the bearing surface plane. At least one recessed surface is formed on the disc-facing surface and is generally positioned outside of the angled inside rail, the angled outside rail and the sub-ambient pressure cavity. The recessed surface(s) is further displaced from the bearing surface plane than the cavity floor.

18 Claims, 12 Drawing Sheets

U.S. PATENT DOCUMENTS

| | | | |
|---|---|---|---|
| 5,490,025 A | 2/1996 | Dorius et al. | 360/103 |
| 5,751,517 A | 5/1998 | Agarwal | 360/103 |
| 5,774,304 A | 6/1998 | Crane et al. | 360/103 |
| 5,831,792 A | 11/1998 | Ananth | 360/103 |
| 5,872,685 A | 2/1999 | Park et al. | 360/103 |
| 5,940,249 A | 8/1999 | Hendriks | 360/103 |
| 6,188,547 B1 | 2/2001 | Gui et al. | 360/236.5 |
| 6,311,388 B1 * | 11/2001 | Berg et al. | 360/235.4 |
| 6,405,426 B1 * | 6/2002 | Kondo | 360/235.5 |
| 6,525,909 B1 * | 2/2003 | Qian et al. | 360/235.7 |
| 6,646,832 B1 * | 11/2003 | Anaya-Dufresne et al. | 360/236.1 |
| 2002/0012199 A1 | 1/2002 | Polycarpou et al. | 360/236.6 |

FOREIGN PATENT DOCUMENTS

| | | |
|---|---|---|
| JP | 56-134354 | 10/1981 |
| JP | 60-13369 | 1/1985 |
| JP | 61-148685 | 7/1986 |
| JP | 1-298585 | 12/1989 |
| WO | WO 99/00792 | 1/1999 |

OTHER PUBLICATIONS

U.S. Appl. No. 10/115,457, filed Apr. 3, 2002, Boutaghou et al.

* cited by examiner

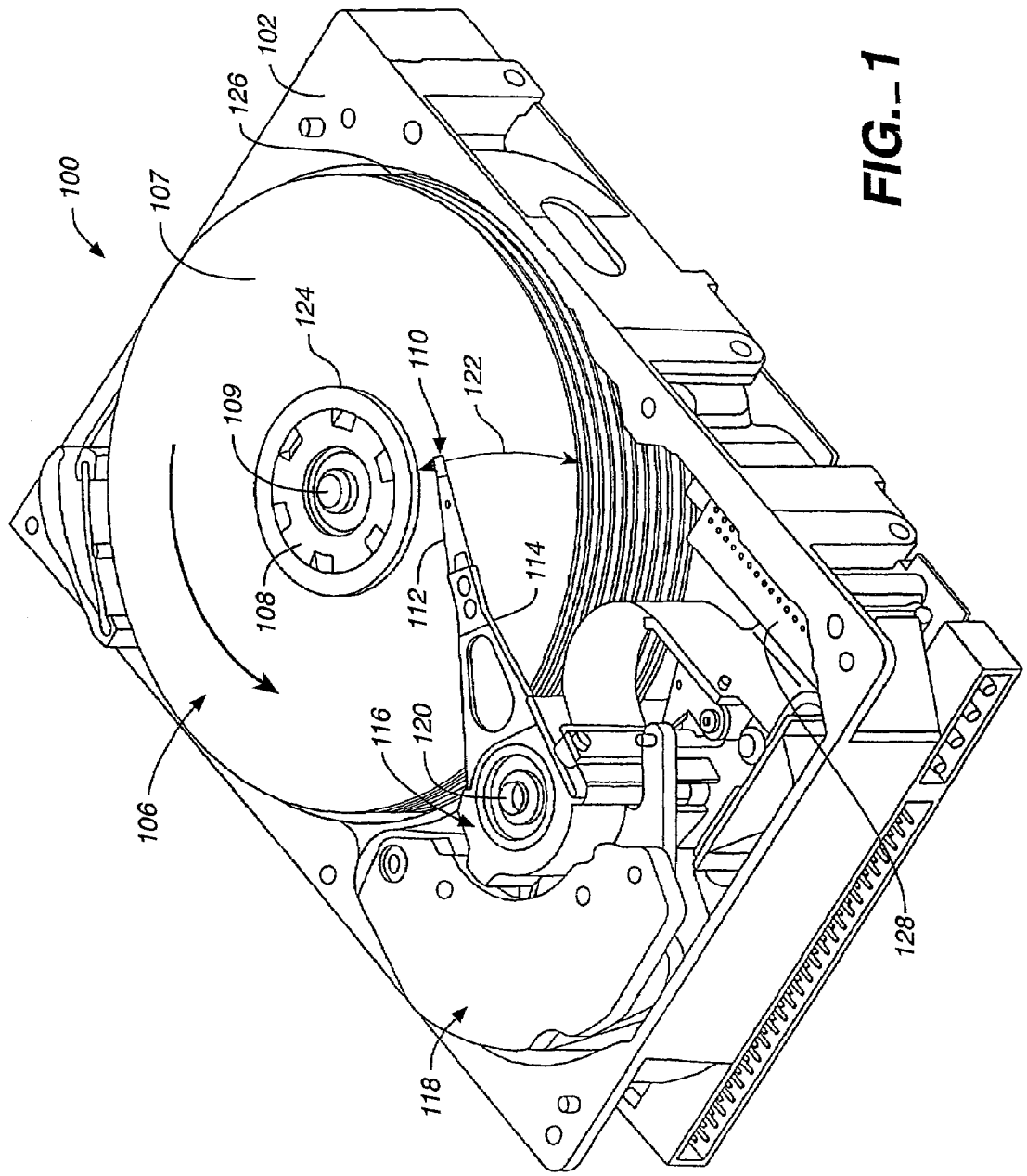
FIG._1

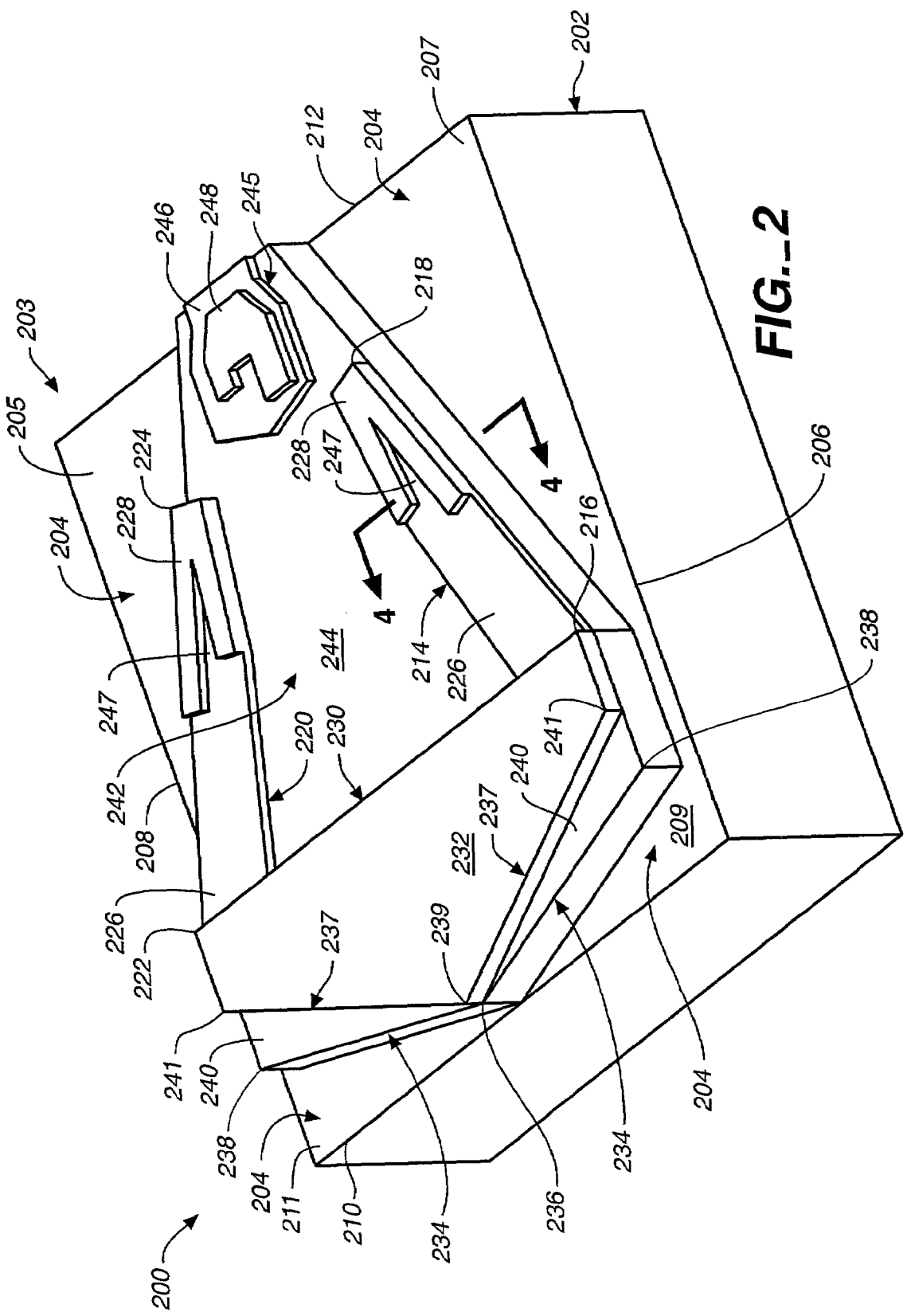
FIG._2

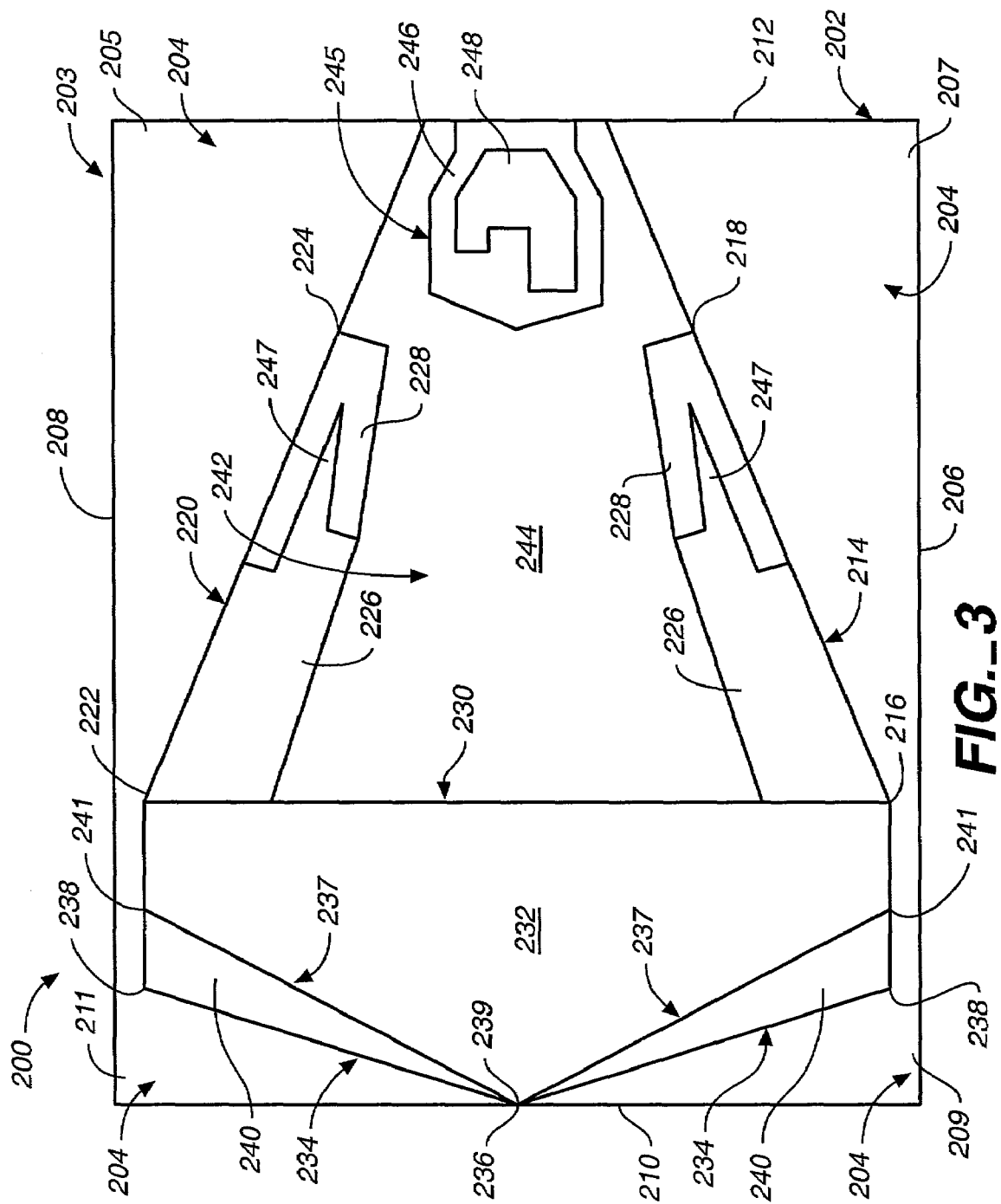
FIG._3

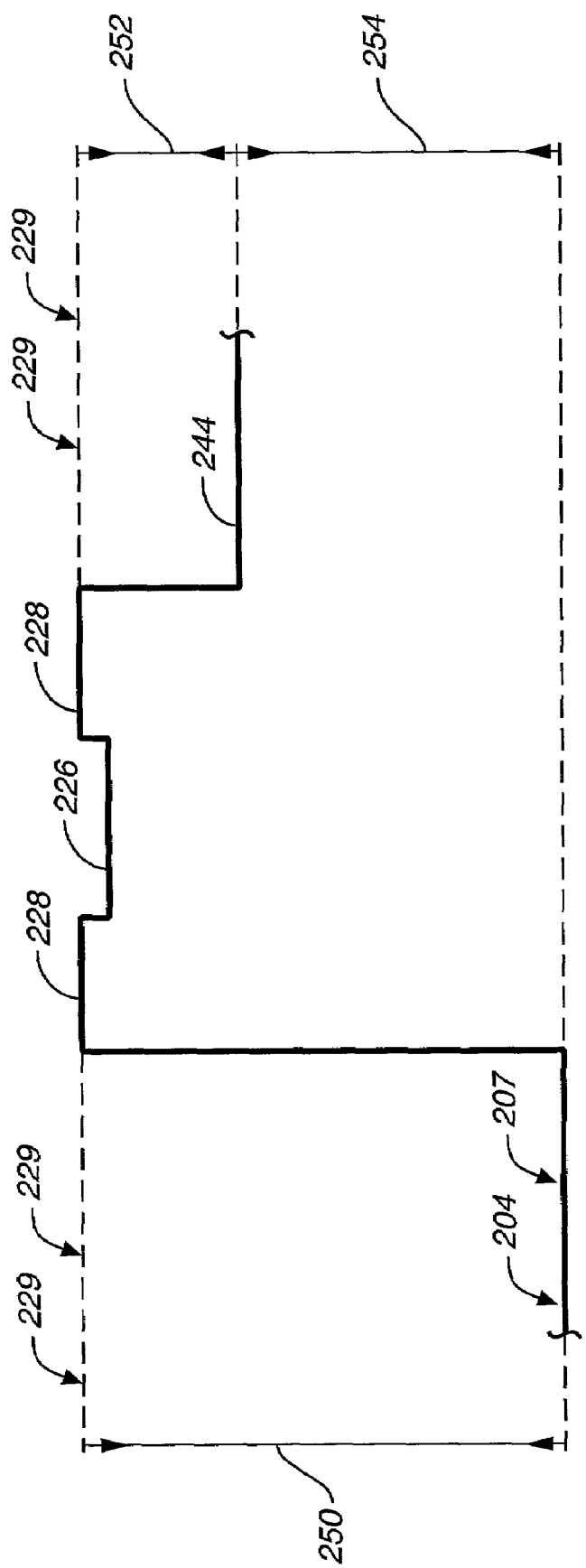
FIG._4

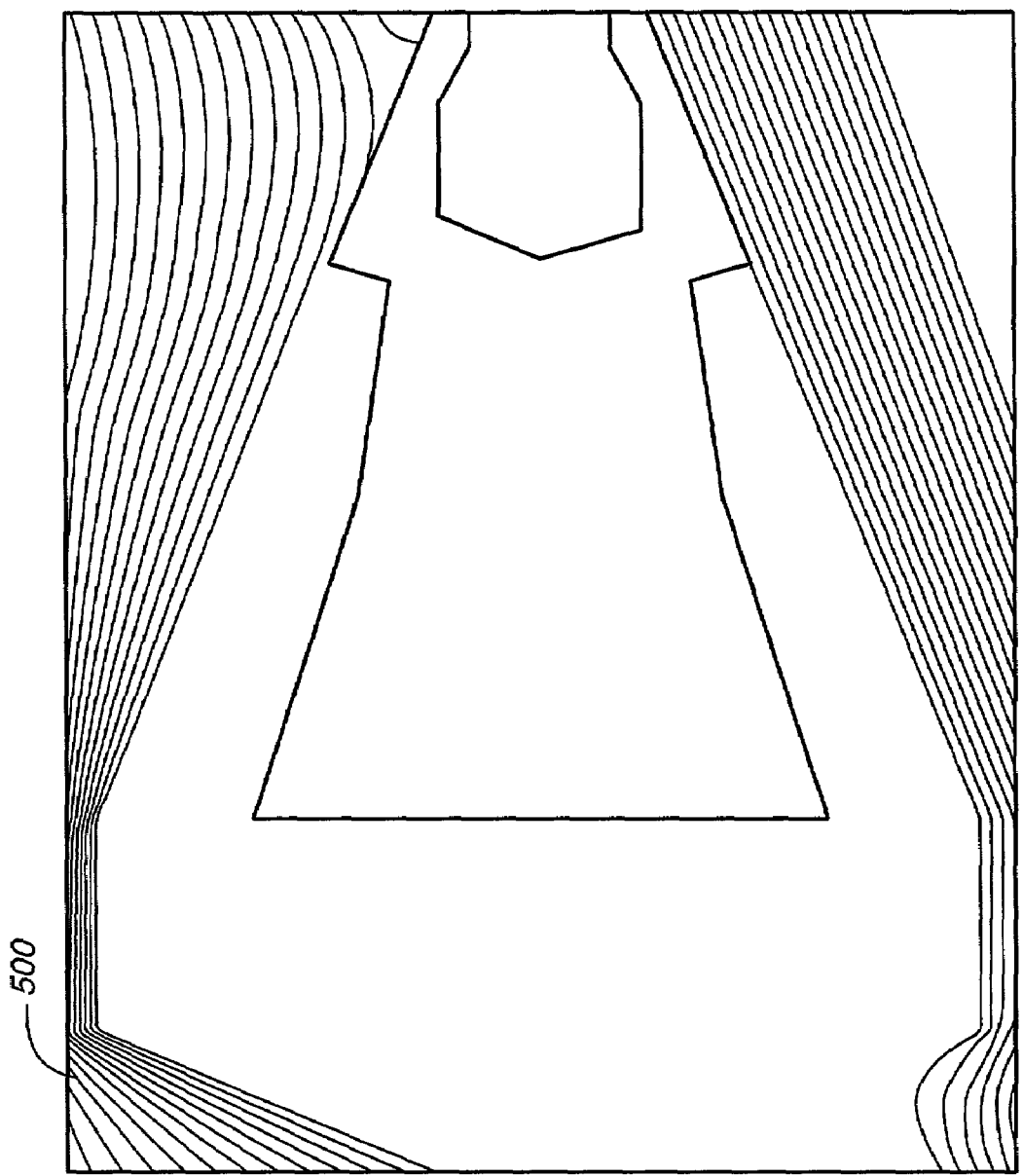
FIG._5

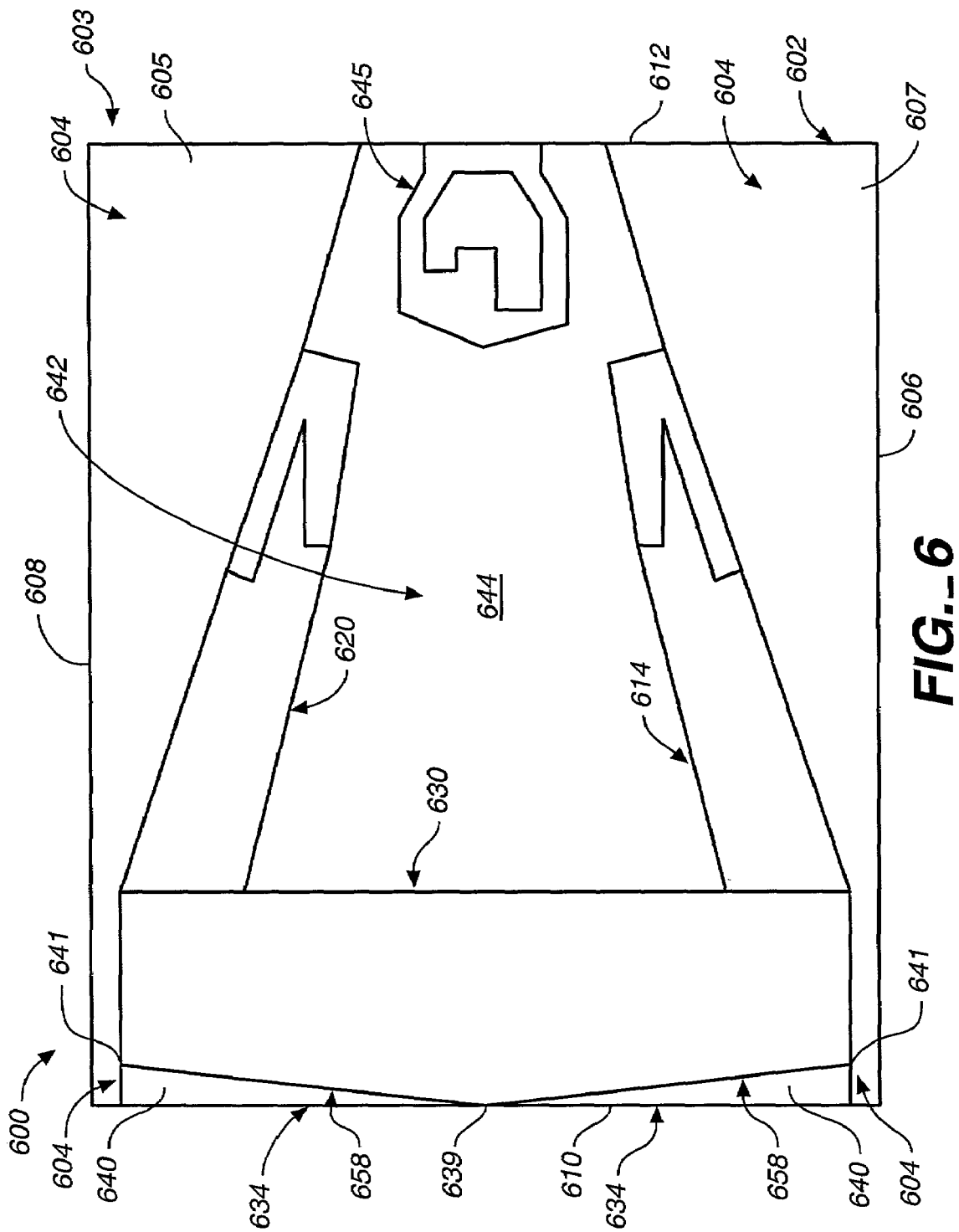
FIG._6

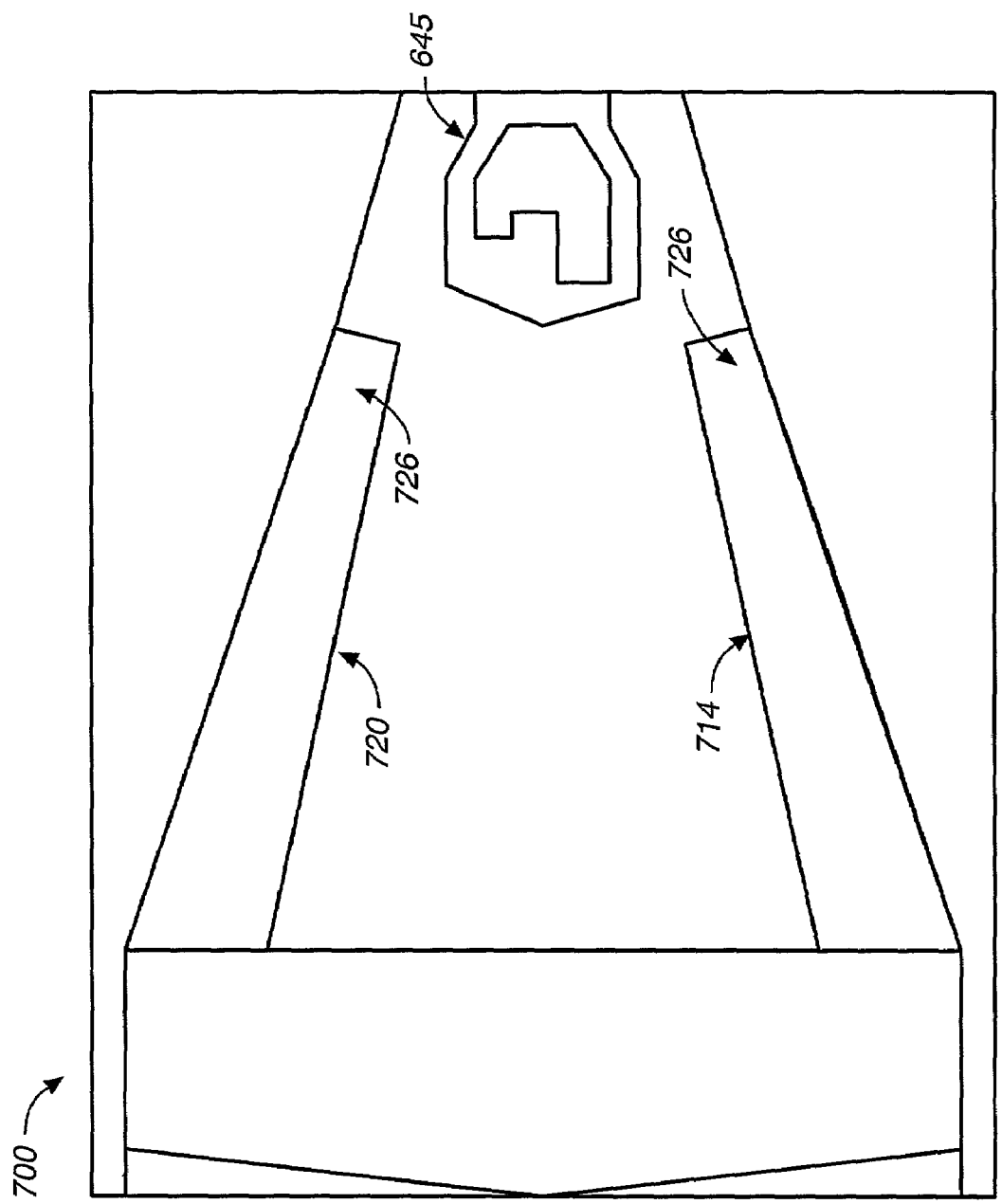
FIG._7

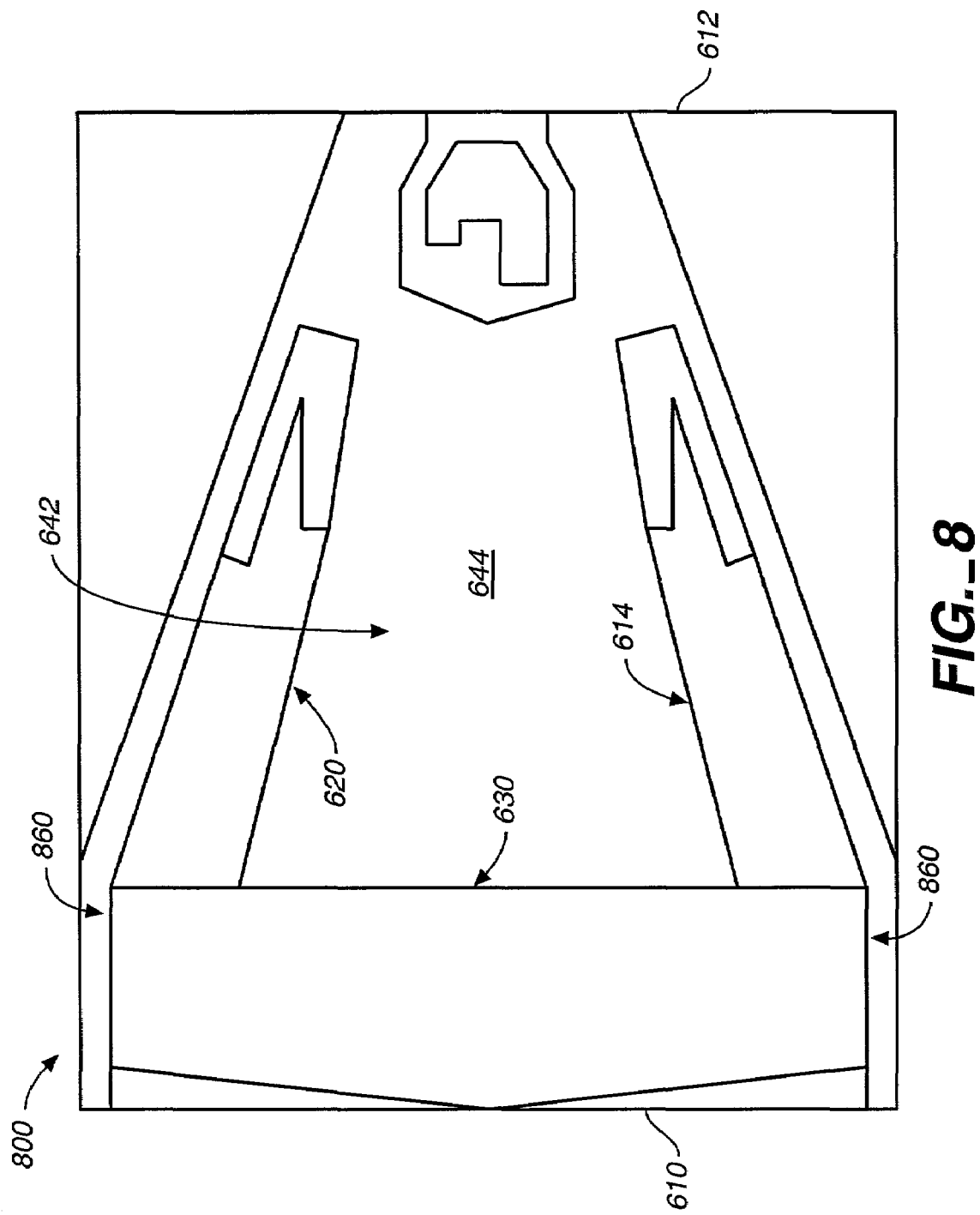
FIG._8

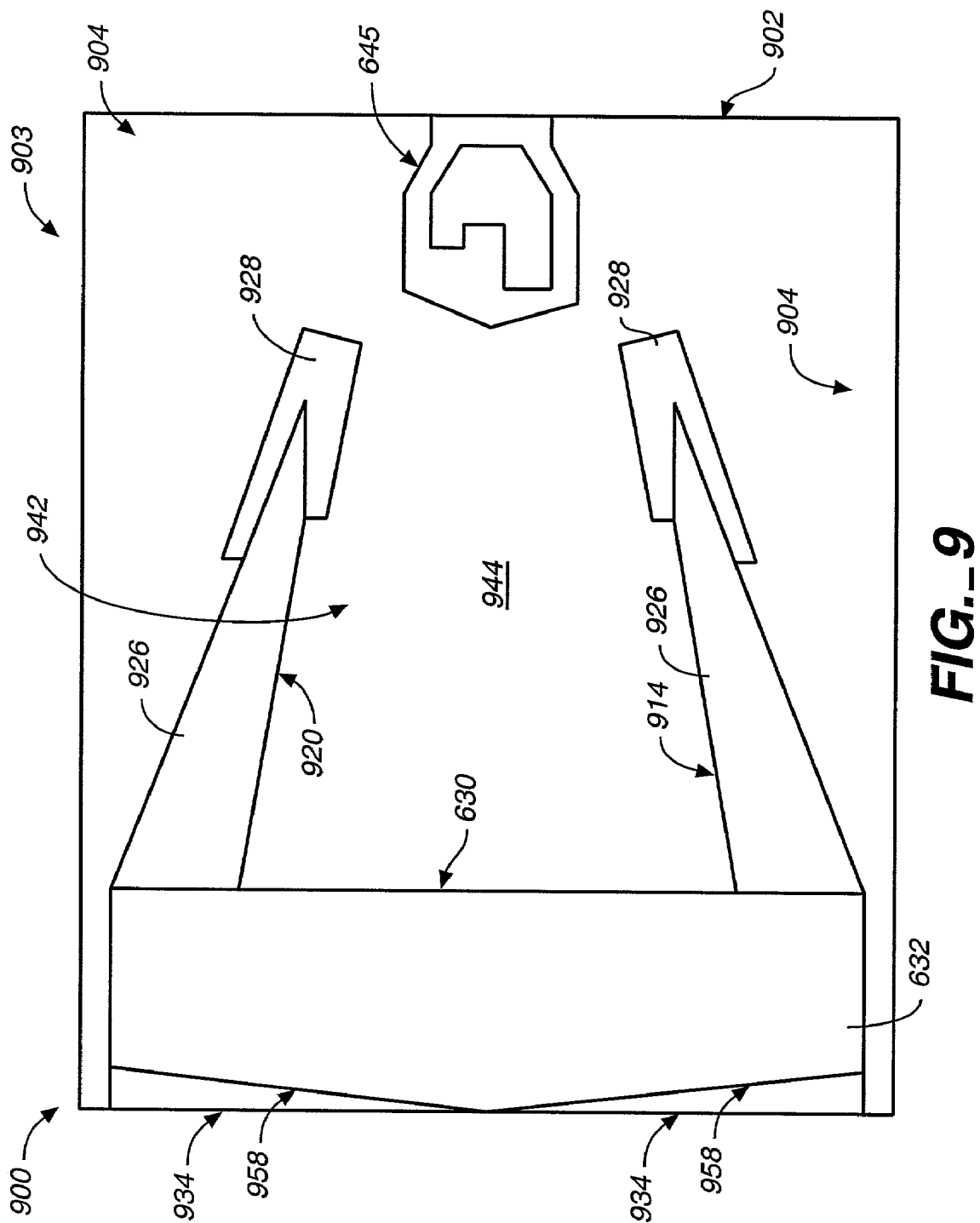
FIG._9

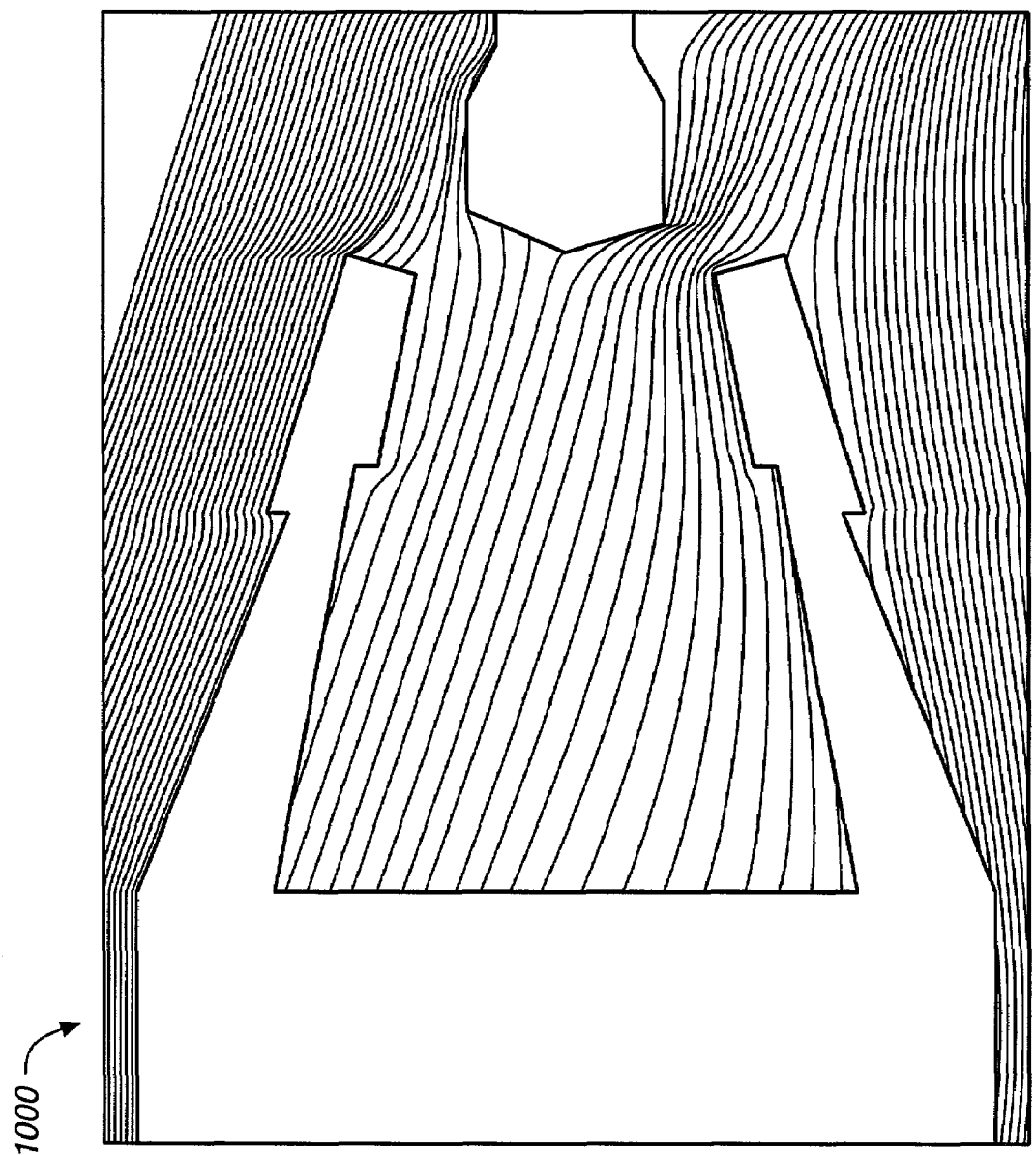
FIG._10

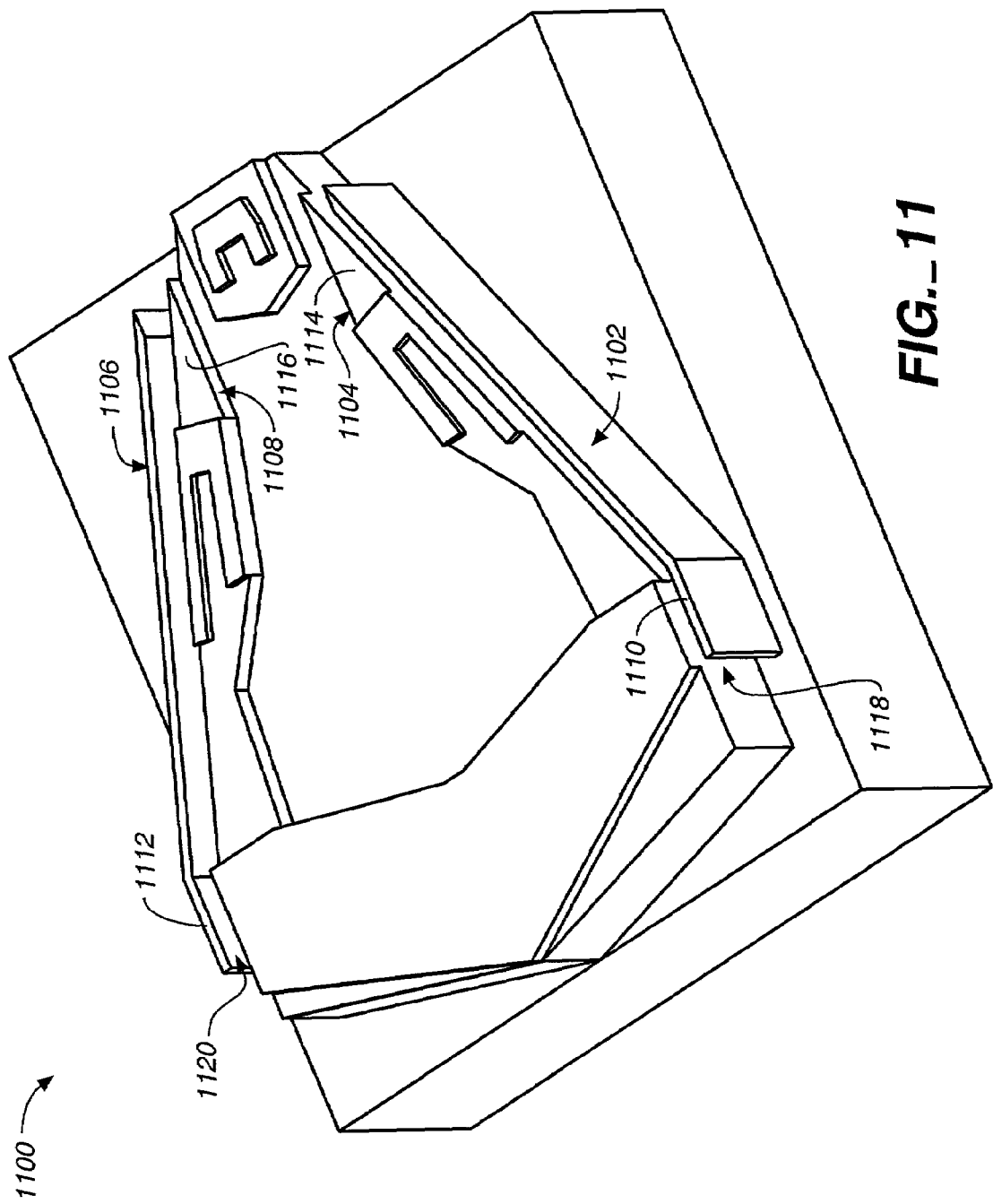
FIG._11

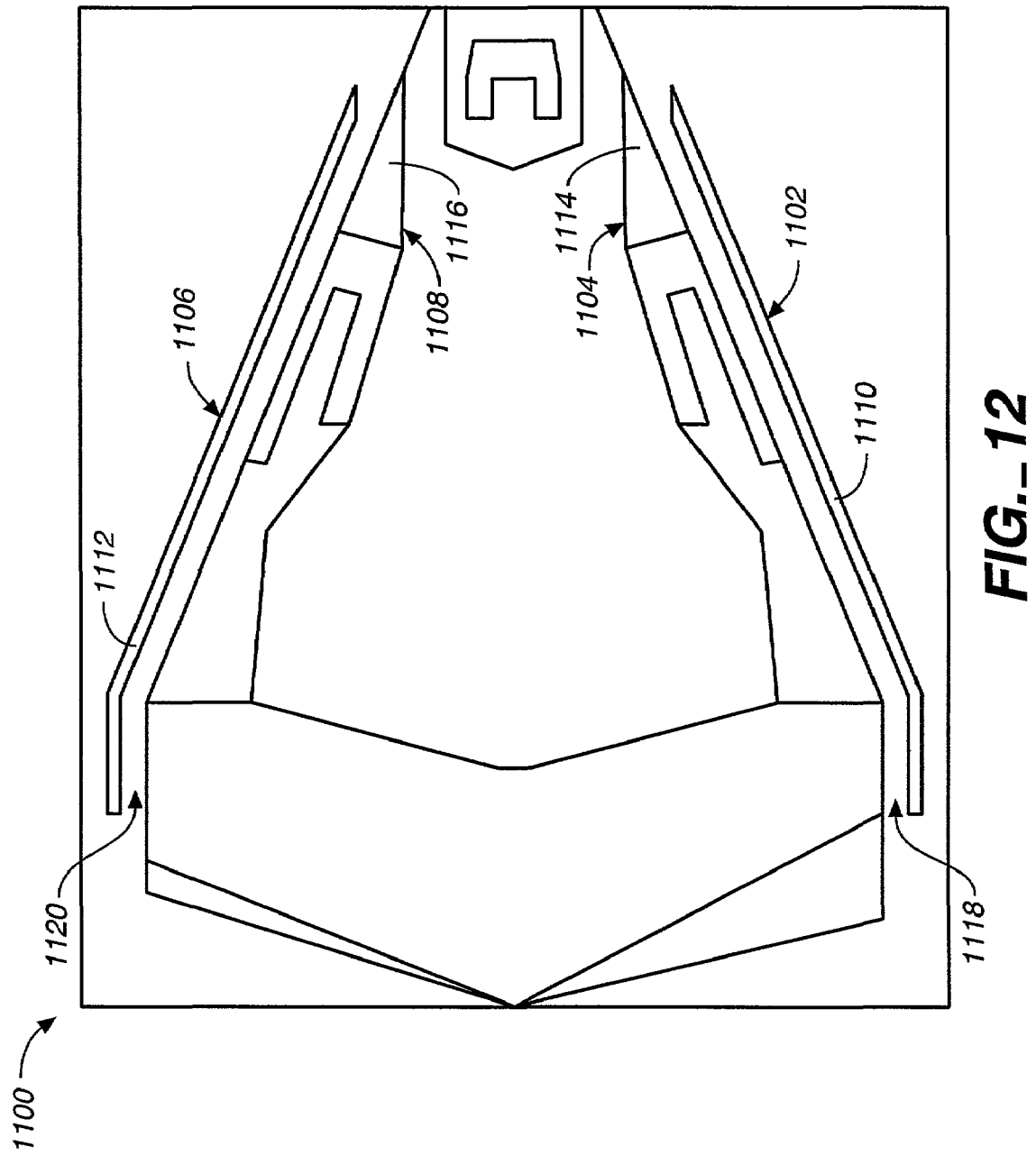
FIG._12

SLIDER WITH CAVITY DAM ANGLED LEADING EDGE AND FURTHER DISPLACED RECESSED SURFACE POSITIONED OUTSIDE ANGLED RAILS

CROSS-REFERENCE TO RELATED APPLICATION

This application claims priority from U.S. Provisional Application Ser. No. 60/314,522 filed on Aug. 22, 2001 for inventor Ram Rao entitled "AIR BEARING DESIGNS TO REDUCE PARTICLE SENSITIVITY AT HIGH SKEWS"; and also claims priority from U.S. Provisional Application Ser. No. 60/318,852 filed on Sep. 13, 2001 for inventor Ram Rao and entitled "AIR BEARING DESIGNS TO REDUCE PARTICLE SENSITIVITY AND IMPROVE DISC FOLLOWING CAPABILITY."

FIELD OF THE INVENTION

The present invention relates generally to disc drive systems, and particularly but not by limitation to disc head sliders within disc drive systems.

BACKGROUND OF THE INVENTION

In data processing systems, disc drives are often used as storage devices. Such drives use rigid discs, which are coated with a magnetizable medium for storage of digital information in a plurality of circular, concentric data tracks. The discs are mounted on a spindle motor, which causes the discs to spin and the surfaces of the discs to pass under respective hydrodynamic (e.g. air) bearing disc head sliders. The sliders carry transducers, which write information to and read information from the disc surfaces.

An actuator mechanism moves the sliders from track-to-track across the surfaces of the discs under control of electronic circuitry. The actuator mechanism includes a track accessing arm and a suspension for each slider assembly. The suspension includes a load beam and a gimbal. The load beam provides a load force which forces the slider toward the disc surface. The gimbal is positioned between the slider and the load beam, or is integrated in the load beam, to provide a resilient connection that allows the slider to pitch and roll while following the topography of the disc.

The slider includes a bearing surface, which faces the disc surface. As the disc rotates, the disc drags air under the slider and along the bearing surface in a direction approximately parallel to the tangential velocity of the disc. As the air passes beneath the bearing surface, air compression along the air flow path causes the air pressure between the disc and the bearing surface to increase, which creates a hydrodynamic lifting force that counteracts the load force and causes the slider to lift and fly above or in close proximity to the disc surface.

One type of slider is a "self-loading" air bearing slider, which includes a leading taper (or stepped-taper), a pair of raised side rails, a cavity dam and a sub-ambient pressure cavity. The leading taper is typically lapped or etched onto the end of the slider that is opposite to the recording head. The leading taper pressurizes the air as the air is dragged under the slider by the disc surface. An additional effect of the leading taper is that the pressure distribution under the slider has a first peak near the taper end or "leading edge" due to a high compression angle of the taper or step, and a second peak near the recording end or "trailing edge" due to a low bearing clearance for efficient magnetic recording. This dual-peak pressure distribution results in a bearing with a relatively high pitch stiffness.

The bearing clearance between the slider and the disc surface at the recording height is an important parameter to disc drive performance. Efforts have been made to design sliders having specialized features on the disc-facing surface that enable the slider to operate at particularly low fly heights. As slider designs evolve and average flying heights continue to be reduced, contamination particles have been observed to become an increasing source of head modulation leading, in some cases, to read/write failures. Many low fly height slider designs have been observed to disadvantageously encourage an accumulation of contamination particles near the trailing edge bearing surface of the slider and/or the transducer region of the slider. Particles that reach these regions of the slider can occasionally lead to irrecoverable data loss.

Many slider designs include a center pad bearing surface (e.g., an air bearing surface) that is situated proximate a trailing edge of the slider's disc-facing surface. The center pad bearing surface is typically situated proximate the transducer and centered laterally along the trailing edge. In many instances, the slider's other disc-facing surface features are configured such that the flow (e.g., air flow) directed at the center pad bearing surface during operation is not emphasized. Configurations such as these are disadvantageous in that it has been observed that an increased pressurization of the center pad bearing surface improves the disc following capability of the transducer.

Embodiments of the present invention provide solutions to these and other problems, and offer advantages over the prior art.

SUMMARY OF THE INVENTION

The present invention relates to data storage devices that include disc head sliders having disc-facing surface configurations that address the above-mentioned problems.

One embodiment of the present invention pertains to a disc head slider having a disc-facing surface which includes a bearing surface that is generally disposed within a bearing surface plane. An angled inside rail, an angled outside rail and a cavity dam are formed on the disc-facing surface. At least one of the angled inside rail, the angled outside rail and the cavity dam includes a surface portion that defines at least a portion of the bearing surface. A sub-ambient pressure cavity is formed between the angled inside and outside rails, and includes a cavity floor that is displaced from the bearing surface plane. At least one recessed surface is formed on the disc-facing surface and is generally positioned outside of the angled inside rail, the angled outside rail and the sub-ambient pressure cavity. The recessed surface(s) is further displaced from the bearing surface plane than the cavity floor. In accordance with one embodiment, the cavity dam includes an angled leading edge.

Another embodiment of the present invention pertains to a disc head slider that includes a slider body having a disc-facing surface which includes a bearing surface that is generally disposed within a bearing surface plane. An angled inside rail, an angled outside rail and a cavity dam are formed on the disc-facing surface. At least one of the angled inside rail, the angled outside rail and the cavity dam includes a surface portion that defines at least a portion of the bearing surface. A sub-ambient pressure cavity is formed on the disc-facing surface between the angled inside and outside rails. The sub-ambient pressure cavity has a cavity floor that is displaced from the bearing surface plane. At least one recessed surface is formed on the disc-facing surface and generally positioned outside of the angled inside rail, the angled outside rail and the sub-ambient pressure cavity. The recessed surface(s) is approximately equal in displacement from the bearing surface plane as compared to the cavity floor. In accordance with one embodiment, the cavity dam includes an angled leading edge.

Another embodiment pertains to a disc head slider with a slider body having a disc-facing surface that includes an inside edge, an outside edge and a bearing surface that is generally disposed within a bearing surface plane. An angled inside rail is formed on the disc-facing surface and has a leading end and a trailing end. The trailing end of the angled inside rail is further disposed from the inside edge of the slider body than the leading end. An angled outside rail is formed on the disc-facing surface and has a leading end and a trailing end. The trailing end of the outside rail is further disposed from the outside edge of the slider body than the leading end. A cavity dam is formed on the disc-facing surface and has an angled leading edge and a surface portion that defines at least a portion of the bearing surface. A sub-ambient pressure cavity is formed on the disc-facing surface between the angled inside and outside rails. The sub-ambient pressure cavity has a cavity floor that is displaced from the bearing surface plane. At least one recessed surface is included and is further displaced from the bearing surface plane than the cavity floor. The recessed surface or surfaces are formed on the disc-facing surface and generally positioned outside of the angled inside rail, the angled outside rail and the sub-ambient pressure cavity. At least one of the recessed surfaces is a first recessed surface generally disposed between the inside edge of the slider body and the angled inside rail. A second recessed surface is generally disposed between the outside edge of the slider body and the angled outside rail.

Other features and benefits that characterize embodiments of the present invention will be apparent upon a reading of the following detailed description and review of the associated drawings.

BRIEF DESCRIPTION OF THE DRAWINGS

FIG. 1 is an isometric view of a disc drive.

FIG. 2 is a perspective view of a slider in accordance with an illustrative embodiment of the present invention.

FIG. 3 is a plan view of the slider of FIG. 2.

FIG. 4 is a cross-sectional view taken along line 4—4 in FIG. 2.

FIG. 5 is a schematic diagram that depicts illustrative operational mass flow lines for the slider of FIG. 2.

FIG. 6 is plan view of a slider in accordance with another illustrative embodiment of the present invention.

FIG. 7 is a plan view of a slider in accordance with another illustrative embodiment of the present invention.

FIG. 8 is a plan view of a slider in accordance with another illustrative embodiment of the present invention.

FIG. 9 is a plan view of a slider in accordance with another illustrative embodiment of the present invention.

FIG. 10 is a schematic diagram that depicts illustrative operational mass flow lines for the slider of FIG. 9.

FIG. 11 is a perspective view of a slider in accordance with an illustrative embodiment of the present invention.

FIG. 12 is a plan of the slider of FIG. 11.

DETAILED DESCRIPTION OF ILLUSTRATIVE EMBODIMENTS

FIG. 1 is an isometric view of a disc drive 100 in which embodiments of the present invention are useful. Disc drive 100 includes a housing with a base 102 and a top cover (not shown). Disc drive 100 further includes a disc pack 106, which is mounted on a spindle motor (not shown) by a disc clamp 108. Disc pack 106 includes a plurality of individual discs 107, which are mounted for co-rotation about central axis 109. Each disc surface has an associated slider 110 which is mounted to disc drive 100 and carries a read/write head for communication with the disc surface. The read/write head can include any type of transducing head, such as an inductive head, a magneto-resistive head, an optical head or a magneto-optical head for example.

In the example shown in FIG. 1, sliders 110 are supported by suspensions 112 which are in turn attached to track accessing arms 114 of an actuator 116. The actuator shown in FIG. 1 is of the type known as a rotary moving coil actuator and includes a voice coil motor (VCM), shown generally at 118. Voice coil motor 118 rotates actuator 116 with its attached sliders 110 about a pivot shaft 120 to position sliders 110 over a desired data track along a path 122 between a disc inner diameter 124 and a disc outer diameter 126. Voice coil motor 118 is driven by servo electronics 128 based on signals generated by sliders 110 and a host computer (not shown). Other types of actuators can also be used, such as linear actuators.

During operation, as discs 107 rotate, the discs drag air under the respective sliders 110 and along their air bearing surfaces in a direction approximately parallel to the tangential velocity of the discs. As the air passes beneath the air bearing surfaces, air compression along the air flow path causes the air pressure between the discs and the air bearing surfaces to increase, which creates a hydrodynamic lifting force that counteracts the load force provided by suspensions 112 and causes the sliders 110 to lift and fly above or in close proximity to the disc surfaces.

In accordance with an embodiment of the present invention, sliders 110 include specialized features formed in their surfaces that face discs 107. Illustratively, some of these specialized features enable reductions in the undesirable accumulation of contamination particles in the transducer regions of sliders 110. In addition, some of the specialized features enhance the flight performance of sliders 110 by improving the disc following capability of transducers associated with sliders 110.

FIG. 2, in accordance with one aspect of the present invention, is a perspective view of a slider 200 as viewed from the surface of a disc, e.g., disc 107 (FIG. 1). The vertical dimensions are exaggerated in FIG. 2 for clarity. FIG. 3 is a plan view of slider 200 as viewed from the surface of a disc. Slider 200 is illustratively designed to operate in a manner similar to the operation of slider 110 described in relation to FIG. 1.

Slider 200 is formed of a substrate having a slider body 202 that includes a disc-facing surface 203. Disc-facing surface 203 includes an inside edge 206, an outside edge 208, a leading edge 210 and a trailing edge 212. Disc-facing surface 203 also includes a variety of features disposed between those edges. For example, disc-facing surface 203 includes an inside rail 214, an outside rail 220, a cavity dam 230, a sub-ambient pressure cavity 242, a center pad 245 and recessed surfaces 204. Each of these disc-facing surface 203 features and various specific individual disc-facing surfaces associated therewith will be described in detail below.

As will be described below, at least one and potentially several of the disc-facing surface 203 features include a bearing surface. When slider 200 is positioned relative a disc (e.g., disc 107 in FIG. 1), the bearing surface(s) will generally be positioned closer to the disc than other surfaces. Illustratively, the bearing surface(s) are generally in a plane that, for the purpose of the present description, will be referred to as the bearing surface plane. In accordance with one embodiment, slider 200 includes multiple bearing surfaces that are generally coplanar within the bearing surface plane and are therefore positioned approximately the same distance from the disc (e.g., disc 107).

Generally speaking, when a disc head slider operates within a disc drive, the slider is typically configured to pitch and roll in response to various topographical features associated with a disc surface. Also, many sliders are configured to demonstrate an operational pitch wherein the trailing end is in closer proximity to the disc surface than the leading end. It should be pointed out, that in the context of the present description, when references are made to the position of slider surfaces relative a disc (e.g., one surface extends further towards the disc surface than another), it shod be assumed that the slider is positioned in a plane that is generally parallel with the disc surface (the slider generally positioned flatly without any pitch or roll displacement).

It should be pointed out that it is common for disc head sliders, such as slider 200, to include a slight curvature in their length and/or width directions. Such curvatures are commonly referred to as slider crown curvature and slider cross curvature. Accordingly, it is to be understood that the surfaces and surface planes described herein, including the bearing surface plane, may reflect slider crown and cross curvature, rather than being disposed in a perfectly flat plane.

For the purpose of the present description, references will be made to surfaces having a relative depth. For example, one surface might have a depth that is greater or less than the depth of another surface. It should be assumed that the described depths are measured from the bearing surface plane. Therefore, "depths," as that term is used in the present description are generally measured from a plane that is generally coplanar with at least one described bearing surface. A surface having a deep or large depth will be further displaced from the bearing surface plane than a surface having a shallow or small depth. A bearing surface will illustratively be assigned a depth value of zero.

Disc-facing surface 203 includes an inside rail 214 that has a rail leading end 216 and a rail trailing end 218. Inside rail 214 is generally angled such that rail trailing end 218 is further displaced from inside edge 206 than rail leading end 216. Disc-facing surface 203 also includes an outside rail 220 that has a rail leading end 222 and a rail trailing end 224. Outside rail 220 is generally angled such that rail trailing end 224 is further displaced from outside edge 208 than rail leading end 222.

Inside rail 214 and outside rail 220 each have a rail step surface 226 that is generally positioned proximate rail leading ends 216 and 222 respectively. Inside rail 214 and outside rail 220 each also have a rail bearing surface 228 that is generally positioned proximate rail trailing ends 218 and 224 respectively. Generally speaking, rail step surfaces 226 are offset in depth from rail bearing surfaces 228. In other words, rail bearing surfaces 228 extend further towards the disc (e.g., disc 107 in FIG. 1) than do the rail step surfaces 226. Surfaces 226 have a deeper or greater depth than surfaces 228 (e.g., because surfaces 228 are bearing surfaces, they illustratively have a depth value of zero).

As is illustrated, a portion of each rail step surface 226 includes a convergent channel portion 247 that extends to a generally "V" shaped area within each rail bearing surface 228. Accordingly, considering the relative depths of rail step surfaces 226 and rail bearing surfaces 228, the rail bearing surfaces 228 are generally open to fluid flow (e.g., air flow) on their leading sides but generally closed to fluid flow on their trailing sides. During operation of slider 200 within a disc drive environment (e.g., see slider 110 in FIG. 1), the illustrated rail configuration illustratively causes a particular pattern of fluid flow (e.g., air flow) and therefore a particular resulting pressure pattern. The resulting pressure pattern illustratively aids at least in the control of the pitch and roll of slider 200 during operation and, depending on the nature of a given slider application, may be desirable for other reasons related to slider operational performance.

It should be pointed out that present manufacturing-related constraints made it difficult to obtain the described "V" shaped area within each rail bearing surface 228. To accommodate present manufacturing processes, the area within each rail bearing surface 228 could be generally "U" shaped or have some other shapes. The shapes illustrated and described herein should be considered only illustrative examples of the many shapes within the scope of the present invention.

It should be noted that the illustrated configuration of rail surfaces 226 and 228 is not critical to the present invention. In accordance with one embodiment, surfaces 226 and 228 have the same depth such that rails 214 and 220 present one generally continuous bearing surface (one for each rail) having a single depth (e.g., the entire rail 214 and 220 each include a single disc-facing surface that generally has the same depth as one of the surfaces 228). Such a configuration would present a different pressure pattern during operation, as compared to the illustrated configuration.

In accordance with another embodiment, surfaces 226 and 228 have the same depth such that rails 214 and 220 present one generally continuous surface (one for each rail) that is positioned at a step depth (e.g., the entire rail 214 and 220 each include a single disc-facing surface that generally has the same depth as one of the surfaces 226). Such a configuration would present yet a different pressure pattern during operation. Different pressure patterns might be desirable depending on the nature of a given slider application and/or slider environment. The specifically described rail surface configurations and other rail surface configurations should be considered within the scope of the present invention.

Disc-facing surface 203 also includes a cavity dam 230 that illustratively, although not necessarily, abuts rails 214 and 220. Cavity dam 230 has a cavity dam upper surface 232 that illustratively, although not necessarily, forms a bearing surface. Cavity dam 230 also has a cavity dam leading edge 234 that is generally angled from a middle point 236 to two side corner points 238, wherein side corner points 238 are generally further displaced from leading edge 210 than middle point 236. Cavity dam 230 further includes a cavity dam upper surface leading edge 237 that is generally angled from a cavity dam upper surface middle point 239 to two cavity dam upper surface side corner points 241. The cavity dam upper surface side corner points 241 are generally further displaced from leading edge 210 than cavity dam upper surface middle point 239.

Cavity dam 230 also includes cavity dam leading surfaces 240. In accordance with one embodiment, surfaces 240 are generally flat and offset in depth from cavity dam upper surface 232, and are also offset from the bearing surface plane. Cavity dam upper surface 232 generally extends further towards the disc (e.g., disc 107 in FIG. 1) than surfaces 240. Surfaces 240 have a deeper or greater depth than surface 232. Cavity dam leading edge 234 illustratively has a deep depth (e.g., same depth as surfaces 240) and cavity dam upper surface leading edge 237 has a shallower depth (e.g., same depth as surface 232).

In accordance with another embodiment, surfaces 240 include a varying depth with the deepest or greatest depth generally being on the leading side of the surfaces and the shallowest or smallest depth generally being on the trailing side of the surfaces. Cavity dam leading edge 234 illustratively has a deep depth (e.g., same depth as deepest portion of surfaces 240) and cavity dam upper surface leading edge 237 has a shallower depth (e.g., same depth as shallowest portion of surfaces 240. Generally speaking, cavity dam leading surfaces 240, despite having a varying depth, will still generally have a depth that is greater than or equal to the depth of cavity dam upper surface 232 in all points on the surfaces. Illustratively, surfaces 240 includes a varying depth as described but specifically embodied in the form of multiple "stair steps" that gradually change depth from one step to the next.

Although illustrated as being in the same general location, middle point 236 and cavity dam upper surface middle point 239 could illustratively be displaced from one another. For example, cavity dam upper surface 232 and/or cavity dam leading surfaces 240 could be configured such that middle points 236 and 239 are disassociated from one another. Neither middle point 236 nor 239 need necessarily be located at or near the center of leading surface 210. Either or both middle points could illustratively be positioned closer to any of edges 206, 208, 210 and/or 212 than illustrated and one middle point could illustratively be positioned closer than the other middle point to any of those edges. Similarly, side points 238 and 241 could illustratively be positioned closer to or further away from leading edge 210 and could coincide with one another. Finally, in accordance with one embodiment, only one of the cavity dam upper surface leading edge 237 and cavity dam leading edge 234 is angled as illustrated (e.g., with a middle point that is closer to edge 210 than two corner points) while the other generally has a square or straight edge (e.g., with middle point and two corner points all in a substantially straight line).

Generally speaking, cavity dam upper surface 232 has a smaller or shallower depth than rail step surfaces 226, and a smaller or shallower depth than cavity dam leading surfaces 240 (e.g., as measured from a bearing surface plane). In accordance with one embodiment, cavity dam upper surface 232 has the same depth as rail bearing surfaces 228 (e.g., surface 232 is also a bearing surface). In accordance with another embodiment, rail step surfaces 226 have the same depth as cavity dam leading surfaces 240. The relative depths of the different surfaces described herein should be considered examples only. Other depth relationships between the different surfaces of the slider embodiments described herein should be considered within the scope of the present invention.

Disc-facing surface 203 further includes a center pad (or rail) 245. Center pad 245 is illustratively, although not necessarily, positioned proximate trailing edge 212 in a location that is generally centered along that edge. Center pad 245 includes a center step surface 246 and a center bearing surface 248. Generally speaking, center step surface 246 is offset in depth from center bearing surface 248. In other words, center bearing surface 248 extends further towards the disc (e.g., disc 107 in FIG. 1) than does center step surface 246. Surface 246 has a greater or deeper depth than surface 248 (e.g., because surface 248 is a bearing surface, it illustratively has a depth value of zero). The depth of center step surface 246 illustratively may be the same or different than the depths of either or both surfaces 226 and 240.

As is illustrated, a portion of center step surface 246 extends into a generally "J" shaped center bearing surface 248. Accordingly, considering the relative depths of center step surface 246 and center bearing surface 248, the center bearing surface 248 is generally open to fluid flow (e.g., air flow) on its leading side but generally closed to fluid flow on its trailing side. Such a configuration causes a particular pattern of fluid flow (e.g., air flow), and therefore a particular resulting pressure pattern during operation. As was stated above, different pressure patterns might be desirable depending upon the particular slider application. The illustrated center pad 245 will illustratively present one particular pressure pattern that might advantageously aid in the control of slider 200 depending on a given slider application. It should be emphasized that the generally "J" shaped center bearing surface 248 could have any of a variety of shapes without departing from the scope of the present invention. For example, center bearing surface could alternatively be a square pad, a round pad, generally "C" shaped, or have some other of a wide variety of shapes. The specific shapes stated herein should be considered examples only. Other shapes should be considered within the scope of the present invention.

It should be noted that the illustrated configuration of center pad 245 is not critical to the present invention. Other configurations that present other pressure patterns could be utilized. Different pressure patterns might be desirable depending on the nature of a given slider application and/or slider environment. The specifically described configuration and other configurations should be considered within the scope of the present invention. It should be noted that disc head slider 200 (as well as the other slider embodiments described below) will also typically include a read/write transducer (not shown) positioned in one of a variety of potential locations on or proximate disc-facing surface 203, such as proximate center pad 245. The precise location of the transducer is not critical to the present invention. Illustratively, certain center pad 245 configurations, rail 214/220 configurations, etc. might be selected to compliment and add performance benefits to a particular placement of a read/write transducer.

Disc-facing surface 203 further includes a sub-ambient pressure cavity 242 that is generally positioned between inside rail 214, outside rail 220 and cavity dam 230 and illustratively, although not necessarily, extends to trailing edge 212. Sub-ambient pressure cavity 242 includes a cavity floor 244.

Disc-facing surface 203 further includes recessed surfaces 204 that include a trailing outside recessed surface 205, a trailing inside recessed surface 207, a leading inside recessed surface 209 and a leading outside recessed surface 211. Illustratively, recessed surfaces 204 are generally positioned outside of rail 214, rail 220, cavity dam 232, and cavity 242.

As illustrated, the features of disc-facing surface 203 are arranged such that recessed surfaces 209 and 211 are not directly connected to one another but are instead interrupted by cavity dam 230. Similarly, recessed surfaces 205 and 207 are not directly connected to one another but instead are interrupted by cavity floor 244 and center pad 245. In accordance with one embodiment, the features of disc-facing surface 203 are otherwise configured such that one or both sets of these non-connected surfaces are instead connected.

As illustrated, the features of disc-facing surface 203 are arranged such that recessed surfaces 207 and 209 are directly connected to one another and are not interrupted by cavity dam 230 or any other surface 203 element. Recessed surfaces 205 and 211 are similarly connected. In accordance with one embodiment, the features of disc-facing surface 203 are otherwise configured such that one or both sets of these connected surfaces are instead non-connected (e.g., the surfaces are interrupted by an extended cavity dam 230).

In accordance with one embodiment, the surfaces of recessed surfaces 204 have depths that are greater or deeper than the other above-described surfaces of the above-described other elements of disc-facing surface 203. In other words, the surfaces of recessed surfaces 204 have the greatest depth of all the above-described disc-facing surface 203 surfaces. In accordance with another embodiment, not all the surfaces of recessed surfaces 204 need have the exact same depth, however, the depth of each surface of the recessed surfaces 204 is still similarly greater than the other surfaces of the disc-facing surface 203.

Recessed surfaces 204 are generally displaced in depth from and have a larger or deeper depth than cavity floor 244 of cavity 242. In other words, the depth of the surfaces of recessed surfaces 204 is generally greater or deeper than the depth of cavity floor 244. In accordance with one embodiment, the cavity floor 244 of sub-ambient pressure cavity 242 has a depth of approximately 2–3 microns while each surface of recessed surfaces 204 has a depth of approximately 10 microns, as measured from a plane that is generally coplanar with at least one of the described bearing surfaces associated with cavity dam 232, rails 214/220 or center pad 245. In accordance with one illustrative embodiment, cavity floor 244 has a depth that is greater or deeper than the depth of rail surfaces 226 and 228, cavity dam surfaces 232 and 240, and center pad surfaces 246 and 248, but less than or shallower than the depth of the surfaces of recessed surfaces 204.

FIG. 4 is a schematic cross-sectional view taken along line 4—4 in FIG. 2. FIG. 4 depicts and clarifies illustrative surface depths. As is illustrated, recessed surface 207 (a particular recessed surface 204) has a depth 250 as measured from a bearing surface plane 229 that is coplanar with rail trailing bearing surfaces 228. In comparison, cavity floor 244 of subambient pressure cavity 242 has a depth 252 as measured from the bearing surface plane 229. Distance 254 represents the distance between surfaces 244 and 207.

In accordance with one embodiment, depth 250 is always greater than depth 252. In accordance with another embodiment, depth 250 is at least twice as deep as deep as depth 252. In accordance with another embodiment, depth 250 has a value that is at least 6 microns, preferably at or between 8 and 10 microns. Depth 250 values greater than 10 microns should also be considered within the scope of the present invention and might be more effective for the functionality contemplated and described below. Such depths, however, are difficult to achieve due to present manufacturing constraints. In accordance with one embodiment, depth 252 has a value at or between 1 and 6 microns, preferably at or between 2 and 3 microns. Illustratively, in terms of depth, recessed surfaces 205, 209 and 211 are similar to or the same as recessed surface 207.

The above depth values and relationships are consistent with, and generally effective in the context of, the functional spirit of the present invention. In accordance with one aspect of the present invention, slider 200 is designed as to be particularly insensitive to contamination particles encountered during the operation of slider 200 within a disc drive environment. In particular, slider 200 is designed to discourage an accumulation of contamination particles near the trailing edge bearing surface (center bearing surface 248) of slider 200, typically the transducer region of the slider. Illustratively, by angling a leading portion of cavity dam 230 and/or rails 214 and 220, and by incorporating recessed surfaces 204 that are particularly recessed from the other disc-facing surface elements, the mass flow pattern under slider 200 during operation can be manipulated to prevent particles from reaching sub-ambient pressure cavity 242 and center bearing surface 248 at trailing edge 212. FIG. 5 is a schematic diagram 500 and depicts illustrative mass flow lines for an operating slider 200 and shows how contamination particles are illustratively diverted away from center bearing surface 248.

Generally speaking, during operation of slider 200, an actuator arm (e.g., arm 144 in FIG. 1) will move the slider such that the slider will experience fluid flow (e.g., air flow) from a variety of angles, commonly known as skew angles. At low skew angle placement of the actuator arm, slider 200 will generally experience fluid flow (e.g., air flow) from the direction of leading edge 210. Accordingly, at low skew angles, contamination particles will primarily enter the head disc interface (HDI) from the leading edge 210 of slider 200. By angling cavity dam leading edge 234 and/or cavity dam upper surface leading edge 237, the fluid flow (e.g., air flow) ahead of slider 200 is manipulated (see FIG. 5) to divert contamination particles away from the HDI. An angled cavity dam leading edge(s) also enables the "plowing" out of the way of loose particles on the disc surface. Due to enhanced pressurization and fluid flow guidance, placement of recessed surfaces 204 ahead (e.g., closer to edge 210) of the angled cavity dam edge(s) illustratively further facilitates the diversion of contamination particles.

At high skew angle placement of the actuator arm, slider 200 will generally experience fluid flow (e.g., air flow) either from the direction of inside edge 206 or outside edge 208. Accordingly, at high skew angles, contamination particles will primarily enter the head disc interface (HDI) from the sides of the slider. Placement of some kind of bearing surface proximate inside edge 206 and/or outside edge 208 might prevent entrance of contamination particles from the side edges. Unfortunately, processing constraints make it generally difficult to place active bearing surfaces close to the sides of the slider.

In accordance with the slider 200 embodiment, inside rail 214 and outside rail 220 are angled to be aligned such that at the approximate maximum skew of slider 200, fluid flow (e.g., air flow) will divert contamination particles away from the sides of the slider, and in particular, away from sub-ambient pressure cavity 242 and center bearing surface 248. Accordingly, contamination particles on or moving above the disc surface are diverted away from the HDI by the angled rails 214 and 220 (see FIG. 5). Due to enhanced pressurization and fluid flow guidance, recessed surfaces 204 illustratively further facilitate the diversion of particles.

In accordance with another aspect of the present invention, slider 200 is advantageous in that the angled configuration of inside rail 214 and outside rail 220 together act as a funnel to squeeze considerable fluid flow (e.g., air flow) towards center pad 245 and its associated surfaces. This illustratively allows for a better pressurization of the center bearing surface 248 during operation of slider 200. Also, since rails 214 and 220 are angled toward the center of trailing edge 212, the positive pressure is localized more to the center of that portion of slider disc-facing surface 203. Assuming a traditional placement of a transducer proximate center pad 245, the result of these pressure pattern characteristics is an advantageous improvement in the disc following capability of the transducer.

Slider 200 is but one illustrative example of many potential embodiments of the present invention. General concepts of the present invention could be applied to generate other configurations that are also embodiments within the scope of the present invention. The most appropriate configuration is application-specific and depends at least on the particular environmental considerations associated with a given slider application. Several additional illustrative embodiments are discussed below in relation to FIGS. 6–10.

FIG. 6 is a plan view of a slider 600 in accordance with another illustrative embodiment of the present invention. Within FIG. 6, elements that are the same or substantially similar to elements described in relation to slider 200 (FIGS. 2 and 3) are similarly or identically labeled. Slider 600 is illustratively designed to operate in a manner similar to the operation of slider 110 described in relation to FIG. 1.

Slider 600 is formed of a substrate having a slider body 602 that includes a slider disc-facing surface 603. Slider disc-facing surface 603 includes an inside edge 606 and an outside edge 608, a leading edge 610 and a trailing edge 612. Disc-facing surface 603 also includes a variety of features disposed between those edges.

Slider 600 is illustratively configured in a manner that is substantially similar to slider 200. For example, slider 600 similarly includes an inside rail 614, an outside rail 620, a sub-ambient pressure cavity 642, a cavity floor 644 and a center pad 645 that are generally configured similar to the corresponding elements described above in relation to FIGS. 2 and 3. Slider 600 also includes a cavity dam 630 that is similar to cavity dam 230. Differences between cavity dam 630 and cavity dam 230 will be described in detail below.

While slider 200 was described as including recessed surfaces 204, slider 600 includes recessed surfaces 604. Unlike slider 200, however, slider 600 includes only an outside recessed surface 605 and an inside recessed surface 607. Recessed surfaces 605 and 607 are located on the outside of cavity dam 630, rails 624/620 and cavity 642. Recessed surfaces 605 and 607 are illustratively configured to divert contamination particles in a manner similar to the diversion described in relation to the recessed surfaces 204 of slider 200 (FIGS. 2 and 3), especially at high operational skew angles. Recessed surfaces 204 and 604 both generally provide a recessed channel along the inside and outside edges of their respective sliders. Recessed surfaces 204, unlike recessed surfaces 604, however, provide an additional channel along the leading edge.

In accordance with one embodiment, the depth of recessed surfaces 605 and 607 is depth 250 (FIG. 4) and the depth of cavity floor 644 is depth 252 (FIG. 4). The depth of recessed surfaces 605 and 607 is illustratively similar to the depth of recessed surface 207 (FIG. 4). The depth relationship between recessed surfaces 605/607 and cavity floor 644 is illustratively similar to the depth relationship between recessed surface 207 and cavity floor 244 (FIG. 4).

With further reference to FIG. 6, slider disc-facing surface 603 includes a cavity dam 630 that illustratively, although not necessarily, abuts rails 614 and 620. Cavity dam 630 has a cavity dam upper surface 632 that illustratively, although not necessarily, forms a bearing surface. Cavity dam 630 also has a cavity dam leading edge 634 that is positioned generally proximate to and generally in alignment with leading edge 610. Cavity dam 630 further includes an angled cavity dam upper surface leading edge 658 that is generally angled from a cavity dam upper surface middle point 639 to two cavity dam upper surface side corner points 641. Side corner points 641 are generally further displaced from leading edge 610 than middle point 639. As illustrated, cavity dam upper surface middle point 639 is positioned generally proximate leading edge 610. In accordance with one illustrative embodiment, cavity dam upper surface 632 is configured such that cavity dam upper surface middle point 639 is positioned closer to any of edges 606, 608, 610 and 612 than illustrated. Similarly, side points 642 could illustratively be positioned closer to or further away from leading edge 610.

Cavity dam 630 further includes cavity dam leading surfaces 640 that are generally flat and have a depth that is greater or deeper than the depth of cavity dam upper surface 632. In accordance with another embodiment, surfaces 640 have a varying depth, similar to an embodiment of surfaces 240 described above in relation to FIGS. 2 and 3. As is illustrated, recessed surfaces 604 are generally not disposed between cavity dam leading edge 634 and leading edge 610. In contrast to recessed surfaces 204 (FIGS. 2 and 3), recessed surfaces 604 engage only a small portion of leading edge 610 at the inside and outside leading corners.

FIG. 7 is a plan view of a slider 700 in accordance with another illustrative embodiment of the present invention. Within FIG. 7, elements that are the same or substantially similar to elements described in relation to slider 200 (FIGS. 2 and 3) and/or slider 600 (FIG. 6) are similarly or identically labeled. Slider 700 is illustratively designed to operate in a manner similar to the operation of slider 110 described in relation to FIG. 1.

Slider 700 is substantially similar to slider 600 illustrated in FIG. 6 except slider 700 includes an angled inside rail 714 in place of angled inside rail 614 and an angled outside rail 720 in place of angled outside rail 620. Whereas the disc-facing surfaces of inside rail 614 and outside rail 620 include bearing surfaces (e.g., rail bearing surfaces 228 in FIGS. 2 and 3) and step surfaces (e.g., rail step surfaces 226 in FIGS. 2 and 3), the disc-facing surfaces of inside rail 714 and outside 720 do not include this combination of surfaces. Instead, the disc-facing surfaces of inside rail 714 and 720 are generally continuous rail step surfaces 726 (a single surface for each rail). In other words, rails 714 and 720 generally do not include any bearing surfaces. Rail step surfaces 726 are illustratively disposed at a single depth that is similar to the depth of rail step surfaces 226, described above in relation to FIGS. 2, 3 and 4.

In accordance with one embodiment, the disc-facing surfaces of inside rail 714 and 720 are generally continuous bearing surfaces (a single surface for each rail). In other words, rails 714 and 720 generally do not include any step surfaces. Rail surfaces 726 are illustratively disposed at a single depth that is similar to the depth of rail bearing surfaces 228, described above in relation to FIGS. 2, 3 and 4.

During operation of slider 700, rails 714 and 720 act as a funnel to squeeze significant fluid flow (e.g., air flow) towards center pad 645. Significant positive pressure is localized in the proximity of center pad 645. Accordingly, rails 714 and 720 improve the disc following capability of the transducer (not show), especially when the transducer is located proximate center pad 645. These effects are enhanced by having no bearing surfaces on rails 714 and 720 because more pressurization is directed to the bearing surface associated with center pad 645. In accordance with one embodiment, slider 700 includes additional bearing surfaces (not illustrated) placed in locations other than on the rails to provide pitch and roll control to slider 700 during operation without significantly drawing pressure away from the bearing surface associated with center pad 645.

FIG. 8 is a plan view of a slider 800 in accordance with another illustrative embodiment of the present invention. Within FIG. 8, elements that are the same or substantially similar to elements described in relation to slider 200 (FIGS. 2 and 3) and/or slider 600 (FIG. 6) are similarly or identically labeled. Slider 800 is illustratively designed to operate in a manner similar to the operation of slider 110 described in relation to FIG. 1.

Slider 800 is substantially similar to slider 600 illustrated in FIG. 6 except slider 800 includes outer channel surfaces 860. In previous embodiments, the sub-ambient pressure cavity 642 generally does not extend outside the slider rails or cavity dam. In contrast, slider 800 includes outer channel surfaces 860 that are generally outside of the general cavity 642 region (e.g., outside of the area bounded by the cavity dam, inside rail and outside rail). Outer channel surfaces 860 generally follow a path on the outside the cavity dam 630 and rails 614/620 and extend between leading edge 610 and trailing edge 612. Outer channel surfaces 860, in particular, follow the angle presented by rails 614/620.

In accordance with one embodiment, outer channel surfaces 860 are generally coplanar and generally contiguous with cavity floor 644 of sub-ambient pressure cavity 642. Accordingly, outer channel surfaces 860 become a cavity level extension of cavity 642 that is on the outside of cavity dam 630 and rails 614 and 620, and that extends from leading edge 610 to trailing edge 612. In accordance with one embodiment, outer channel surfaces 860 have the same depth as cavity floor 644 (e.g., depth 252 in FIG. 4).

FIG. 9 is a plan view of a slider 900 in accordance with another illustrative embodiment of the present invention. Within FIG. 7, elements that are the same or substantially similar to elements described in relation to slider 200 (FIGS. 2 and 3) and/or slider 600 (FIG. 6) are is similarly or identically labeled. Slider 700 is illustratively designed to operate in a manner similar to the operation of slider 110 described in relation to FIG. 1.

Slider 900 is substantially similar to slider 600 illustrated in FIG. 6 except slider 900 includes an angled inside rail 914 in place of angled inside 20 rail 614 and an angled outside rail 920 in place of angled outside rail 620. It was previously described that rails 614 and 620 (similar to rails 214 and 220) each include a rail recessed step surface 226 and a rail trailing bearing surface 228. Similarly, rails 914 and 920 each include a rail recessed step surface 926 and a rail trailing bearing surface 928. The general shape of surfaces 926/928, however, are quite different then their surface 226/228 counterparts.

It should be noted that no specific shape of the angled rails is critical to the present invention. Various angled rails having different shapes might be more or less desirable depending on the nature of a given slider application and/or slider environment. Some shapes might be more effective for diverting contamination particles, while other shapes might be more effective for focusing pressure at center pad 645, and while still other shapes might provide a combination of both of these potential benefits. The specifically described angled rail configurations and other angled rail configurations should be considered within the scope of the present invention.

There is at least one other notable difference between slider 900 and slider 600 (FIG. 6). Slider 900 includes recessed surfaces 904 and a sub-ambient pressure cavity 942 having a cavity floor 944. These components are in place of slider 600's recessed surfaces 604, sub-ambient pressure cavity 642 and cavity floor 644. The primary difference between the slider 900 configuration of these elements and the slider 600 configuration lies in the relative depth relationship between the cavity floor element 944/644 and the recessed surfaces 904/604.

In the context of slider 600, sub-ambient pressure cavity 642 includes a cavity floor 644 that is positioned at a depth that is smaller or shallower than the depth of the recessed surfaces 604. In other words, recessed surfaces 604 are displaced in depth from cavity floor 644. In contrast, in the context of slider 900, the cavity floor 944 of sub-ambient pressure cavity 942 is disposed at generally the same depth as recessed surfaces 904. In accordance with one embodiment, cavity floor 944 and recessed surfaces 904 are coplanar and generally contiguous surfaces. In accordance with another embodiment, cavity floor 944 and recessed surfaces 904 have a depth that is similar to one of the depths 250 and 252 described above in relation to FIG. 4.

FIG. 10 is a schematic diagram 1000 and depicts illustrative mass flow lines for an operating slider 900 and shows how the angled side rails act as a funnel to channel substantial fluid flow (e.g., air flow) towards the center pad 245.

FIG. 11, in accordance with an embodiment of the present invention, is a perspective view of a slider 1100 as viewed from the surface of a disc, e.g., disc 107 (FIG. 1). The vertical dimensions are exaggerated in FIG. 11 for clarity. FIG. 12 is a plan view of slider 1100 as viewed from the surface of a disc. Slider 1100 is illustratively designed to operate in a manner similar to the operation of slider 110 described in relation to FIG. 1.

The features of slider 1100 are substantially similar to the features of slider 200, the latter slider being thoroughly described above in relation to FIGS. 2–5. Slider 1100, however, incorporates several features that slider 200 does not include. For example, slider 1100 includes an inside channel wall 1102, an inside rail extension 1104, an outside channel wall 1106 and an outside rail extension 1108.

Inside channel wall 1102 has a surface 1110. Outside channel wall 1106 has a surface 1112. Surfaces 1110 and 1112 are illustratively bearing surfaces. However, in accordance with one embodiment, one of or both surfaces 1110 and 1112 are displaced from the bearing surface plane. Inside rail extension 1104 has a surface 1114. Outside rail extension 1108 has a surface 1116. Surfaces 1114 and 1116 are illustratively displaced from the bearing surface plane. However, in accordance with one embodiment, one of or both surfaces 1114 and 1116 are bearing surfaces.

Inside channel wall 1102 illustratively cooperates with inside channel extension 1104 and other slider 1100 features to define an inside channel 1118. Outside channel wall 1106 illustratively cooperates with outside channel extension 1108 and other slider 1100 features to define an outside channel 1120. Channel extensions 1104 and 1108 are illustratively optional elements. Channel walls 1102 and 1106 could illustratively be included in association with or totally independent of channel extensions 1104 and 1108.

In the context of many known slider designs, during disc drive operation, contamination particles are easily able to enter the head disc interface from the sides of the slider. Placing some kind of a bearing surface proximate the side edges of the slider could discourage this outcome. Unfortunately, however, manufacturing and processing restraints do not easily allow placement of an active bearing surface close to the sides of a slider.

In the context of slider 1100, during disc drive operation, channels 1118 and 1120 encourage a mass flow patter that actively flushes contamination particles to the trailing edge of the slider, thus discouraging the contamination particles from reaching the cavity and the center pad bearing surface. Accordingly, channels 1118 and 1120 decrease the sensitivity of slider 1100 to contamination particles, and particularly decrease the sensitivity to contamination particles that approach the slider from its sides.

In summary, one embodiment of the present invention pertains to a disc head slider (110, 200, 600, 700, 800) that includes a slider body (202, 602) having a disc-facing surface (203, 603) which includes a bearing surface (228, 232, 248) that is generally disposed within a bearing surface plane (229). An angled inside rail (214, 614, 714), an angled outside rail (220, 620, 720) and a cavity dam (230, 630) are formed on the disc-facing surface (203, 603). At least one of the angled inside rail (214, 614, 714), the angled outside rail (220, 620, 720) and the cavity dam (230, 630) includes a surface portion (228, 232) that defines at least a portion of the bearing surface. A sub-ambient pressure cavity (242, 642) is formed between the angled inside and outside rails (214, 614, 714, 220, 620, 720), and includes a cavity floor (244, 644) that is displaced from the bearing surface plane (229). At least one recessed surface (204, 205, 207, 209, 211, 604, 605, 607, 609, 611) is formed on the disc-facing surface (203, 603) and is generally positioned outside of the angled inside rail (214, 614, 714), the angled outside rail (220, 620, 720) and the sub-ambient pressure cavity (242, 642). The recessed surface(s) (204, 205, 207, 209, 211, 604, 605, 607, 609, 611) is further displaced from the bearing surface plane (229) than the cavity floor (244, 644). In accordance with one embodiment, the cavity dam (230, 630) includes an angled leading edge (234, 237, 634, 658).

Another embodiment pertains to a disc head slider (110, 900) that includes a slider body (902) having a disc-facing surface (903) which includes a bearing surface (928) that is generally disposed within a bearing surface plane (229). An angled inside rail (914), an angled outside rail (920) and a cavity dam (630) are formed on the disc-facing surface (903). At least one of the angled inside rail (914), the angled outside rail (920) and the cavity dam (630) includes a surface portion (928, 632) that defines at least a portion of the bearing surface (632, 928). A sub-ambient pressure cavity (942) is formed on the disc-facing surface (903) between the angled inside and outside rails (914, 920). The sub-ambient pressure cavity (942) has a cavity floor (944) that is displaced from the bearing surface plane (229). At least one recessed surface (904) is formed on the disc-facing surface (903) and generally positioned outside of the angled inside rail (914), the angled outside rail (920) and the sub-ambient pressure cavity (942). The recessed surface(s) (904) is approximately equal in displacement from the bearing surface plane (229) as compared to the cavity floor (944). In accordance with one embodiment, the cavity dam (630) includes an angled leading edge (934, 958).

Another embodiment pertains to a disc head slider (110, 200, 600, 700 and 800) that includes a slider body (202, 602) having a disc-facing surface (203, 603) that includes an inside edge (206, 606), an outside edge (208, 608) and a bearing surface (228, 232, 248) that is generally disposed within a bearing surface plane (229). An angled inside rail (214, 614, 714) is formed on the disc-facing surface (203, 603) and has a leading end (216) and a trailing end (218). The trailing end (218) of the angled inside rail (214, 614, 714) is further disposed from the inside edge (206, 606) of the slider body (202, 602) than the leading end (216). An angled outside rail (220, 620, 720) is formed on the disc-facing surface (203,603) and has a leading end (222) and a trailing end (224). The trailing end (224) of the outside rail (220, 620, 720) is further disposed from the outside edge (208, 608) of the slider body (202, 602) than the leading end (222). A cavity dam (230, 630) is formed on the disc-facing surface (203, 603) and has an angled leading edge (234, 237, 658) and a surface portion (232) that defines at least a portion of the bearing surface. A sub-ambient pressure cavity (242, 642) is formed on the disc-facing surface (203, 603) between the angled inside and outside rails (214, 220, 614, 620, 714, 720). The sub-ambient pressure cavity (242, 642) has a cavity floor (244, 644) that is displaced from the bearing surface plane (229). At least one recessed surface (204, 205, 207, 209, 211, 604, 605, 607, 609, 611) is further displaced from the bearing surface plane (229) than the cavity floor (244, 644). The recessed surface or surfaces (204, 205, 207, 209, 211, 604, 605, 607, 609, 611) are formed on the disc-facing surface (203, 603) and are generally positioned outside of the angled inside rail (214, 614, 714), the angled outside rail (220, 620, 720) and the sub-ambient pressure cavity (242, 642), wherein said at least one recessed surface (204, 205, 207, 209, 211, 604, 605, 607, 609, 611) includes a first recessed surface (207, 607) generally disposed between the inside edge of the slider body (206, 606) and the angled inside rail (214, 614, 714), and a second recessed surface (205, 605) generally disposed between the outside edge (208, 608) of the slider body (202, 602) and the angled outside rail (220, 620, 720).

It is to be understood that even though numerous characteristics and advantages of various embodiments of the invention have been set forth in the foregoing description, together with details of the structure and function of various embodiments of the invention, this disclosure is illustratively only, and changes may be made in detail, especially in matters of structure and arrangement of parts within the principles of the present invention to the full extent indicated by the broad general meaning of the terms in which the appended claims are expressed. For example, the particular elements may vary depending on the particular application for the disc drive system while maintaining substantially the same functionality without departing from the scope and spirit of the present invention. In addition, although the preferred embodiment described herein is directed to a disc head slider having a specialized disc-facing surface configurations, it will be appreciated by those skilled in the art that the teaching of the present invention can be applied to other types of sliders, such as a positive pressure slider having no cavity dam and sliders having different numbers of rails and rail shapes without departing from the scope and spirit of the present invention. Also, the present invention can be used with any type of ramp load-unload or contact start-stop suspension, such as rotary and linear suspensions, and the transducing head can be of any type such as magnetic, magneto-resistive, optical or magneto-optical, for example.

What is claimed is:

1. A slider comprising:
   a slider body having a slider surface that includes a bearing surface that is generally disposed within a bearing surface plane;
   an angled inside rail, an angled outside rail and a cavity dam formed on the slider surface, wherein at least one of the angled inside rail, the angled outside rail and the cavity dam includes a surface portion that defines at least a portion of the bearing surface;
   a sub-ambient pressure cavity positioned on the slider surface between the angled inside and outside rails, the sub-ambient pressure cavity having a cavity floor that is displaced from the bearing surface plane;
   at least one recessed surface that is further displaced from the bearing surface plane than the cavity floor, said at least one recessed surface being generally positioned outside of the angled inside rail, the angled outside rail and the sub-ambient pressure cavity;
a leading edge of the slider surface;
wherein the cavity dam includes an angled leading edge that is angled from a middle point to two side corner points, the two side corner points being further displaced from the leading edge of the slider surface than the middle point.

2. The slider of claim 1, wherein the cavity dam further comprises:
a cavity dam upper surface;
a cavity dam leading surface which is displaced from the cavity dam upper surface and displaced from the bearing surface plane; and
wherein at least one of the cavity dam upper surface and the cavity dam leading surface includes an angled leading edge having a middle dam point and a plurality of side corner dam points, the plurality of side corner dam points being further disposed from the leading edge of the slider surface than the middle dam point.

3. The slider of claim 2, wherein the cavity dam is positioned generally proximate the leading edge of the slider surface.

4. The slider of claim 1, wherein the slider surface further comprises an inside edge and a trailing edge, and wherein said at least one recessed surface comprises:
an inside trailing recessed surface generally disposed between the angled inside rail and the inside edge of the slider surface, and extending to the trailing edge of the slider surface.

5. The slider of claim 1, wherein the slider surface further comprises an outside edge and a railing edge, and wherein said at least one recessed surface comprises:
an outside trailing recessed surface generally disposed between the angled outside rail and the outside edge of the slider surface, and extending to the trailing edge of the slider surface.

6. The slider of claim 1, wherein said at least one recessed surface comprises:
at least one leading recessed surface generally disposed between the cavity dam and the leading edge of the slider surface.

7. The slider of claim 1, wherein the cavity dam is positioned generally proximate the leading edge of the slider surface.

8. The slider of claim 1, wherein the surface further comprises an inside edge, an outside edge and a trailing edge, and wherein said at least one recessed surface comprises:
an inside trailing recessed surface generally disposed between the angled inside rail and the inside edge of the slider surface, and extending to the trailing edge of the slider surface;
an outside trailing recessed surface generally disposed between the angled outside rail and the outside edge of the slider surface, and extending to the trailing edge of the slider surface; and
at least one leading recessed surface generally disposed between the cavity dam and the leading edge of the slider surface.

9. The slider of claim 1, wherein said at least one recessed surface is generally disposed a distance from the bearing surface plane that is at least twice as far as the distance from which the cavity floor is disposed from the bearing surface plane.

10. The slider of claim 1, wherein said at least one recessed surface is generally disposed a distance from the bearing surface plane that is in the range of approximately 8 to 10 microns.

11. The slider of claim 1, wherein said at least one recessed surface is generally disposed a distance from the bearing surface that is at least 6 microns.

12. The slider of claim 1, wherein said cavity floor is generally disposed a distance from the bearing surface plane that is in the range of approximately 2 to 3 microns.

13. The slider of claim 1, wherein the slider surface further comprises an outside edge, wherein the angled outside rail includes a rail leading end and a rail trailing end, and wherein the angled outside rail is configured such that the rail trailing end is further disposed from the outside edge of the slider surface than the rail leading end.

14. The slider of claim 1, wherein the slider surface further comprises an inside edge, wherein the angled inside rail includes a rail leading end and a rail trailing end, and wherein the angled inside rail is configured such that the rail trailing end is further disposed from the inside edge of the slider surface than the rail leading end.

15. The slider of claim 1, further comprising at least one outer channel surface that is coplanar with the cavity floor and generally disposed outside and adjacent to at least one of the angled inside rail and angled outside rail.

16. The slider of claim 1, further comprising a channel wall that is disposed outside of the sub-ambient pressure cavity, said channel wall being displaced from one of the angled inside and outside rails so as to form a channel between the channel wall and the angled rail.

17. The slider of claim 16, wherein the channel wall includes a bearing surface disposed within the bearing surface plane.

18. A slider comprising:
a slider body having a slider surface that includes an inside edge, an outside edge and a bearing surface that is generally disposed within a bearing surface plane;
an angled inside rail formed on the slider surface and having a leading end and a trailing end, the trailing end of the angled inside rail being further disposed from the inside edge of the slider body than the leading end;
an angled outside rail formed on the slider surface and having a leading end and a trailing end, the trailing end of the outside rail being further disposed from the outside edge of the slider body than the leading end of the outside rail;
a cavity dam formed on the slider surface and having an angled leading edge and a surface portion that defines at least a portion of the bearing surface, wherein the slider surface further comprises a leading edge, and wherein the angled leading edge of the cavity dam is angled from a middle point to two side corner points, the two side corner points being further displaced from the leading edge of the slider surface than the middle point;
a sub-ambient pressure cavity formed on the slider surface between the angled inside and outside rails, wherein the sub-ambient pressure cavity has a cavity floor that is displaced from the bearing surface plane; and
at least one recessed surface that is further displaced from the bearing surface plane than the cavity floor, said at least one recessed surface being formed on the slider surface and generally positioned outside of the angled inside rail, the angled outside rail and the sub-ambient pressure cavity, wherein said at least one recessed surface includes a first recessed surface generally disposed between the inside edge of the slider body and the angled inside rail, and a second recessed surface generally disposed between the outside edge of the slider body and the angled outside rail.

* * * * *